United States Patent [19]

Yoshioka et al.

[11] 4,452,649

[45] Jun. 5, 1984

[54] MOTORCYCLE DISC BRAKING MATERIALS OF A LOW CARBON MARTENSITIC STAINLESS STEEL

[75] Inventors: Keiichi Yoshioka, Chiba; Noboru Kinoshita; Yutaka Ono, both of Ichihara, all of Japan

[73] Assignee: Kawasaki Steel Corporation, Kobe, Japan

[21] Appl. No.: 448,901

[22] PCT Filed: May 28, 1982

[86] PCT No.: PCT/JP82/00210

§ 371 Date: Dec. 3, 1982

§ 102(e) Date: Dec. 3, 1982

[87] PCT Pub. No.: WO82/04268

PCT Pub. Date: Dec. 9, 1982

[30] Foreign Application Priority Data

May 30, 1981 [JP] Japan .................................. 56/83132

[51] Int. Cl.³ .............................................. C22C 38/40
[52] U.S. Cl. ........................................ 148/37; 75/125; 75/128 N; 75/126 J; 188/251 M; 188/218 XL

[58] Field of Search ............... 148/37; 75/125, 128 A, 75/128 N, 126 B, 126 J; 188/251 A, 251 M, 218 XL; 192/107 M

[56] References Cited

U.S. PATENT DOCUMENTS

| | | | |
|---|---|---|---|
| 2,891,859 | 6/1959 | Kegerise | 75/128 N |
| 3,559,775 | 2/1971 | Miller | 75/126 Q |
| 4,166,521 | 9/1979 | Okunishi et al. | 148/37 |

FOREIGN PATENT DOCUMENTS 56-35754  4/1981  Japan .................................. 148/37

*Primary Examiner*—L. Dewayne Rutledge
*Assistant Examiner*—Debbie Yee
*Attorney, Agent, or Firm*—Balogh, Osann, Kramer, Dvorak, Genova & Traub

[57] ABSTRACT

This invention belongs to the technical field of martensitic stainless steels and the moderate hardness, toughness and corrosion resistance required for motorcycle braking disc materials can be provided only by quenching at a broad range of quenching temperature by restraining the content of C+N in the steels to 0.04–0.10% and containing 1.0–2.5% of Mn and 10.0–14.5% of Cr.

1 Claim, No Drawings

MOTORCYCLE DISC BRAKING MATERIALS OF A LOW CARBON MARTENSITIC STAINLESS STEEL

TECHNICAL FIELD

The present invention relates to a motorcycle disc braking material of a low carbon martensitic stainless steel and particularly to a motorcycle disc braking material, which is easily produced and has a high rust resistance as well as excellent toughness and abrasion resistance.

BACKGROUND ART

Presently, stainless steels are used for the brake disc of motorcycles but such a disc demands high corrosion resistance, toughness and abrasion resistance as the properties. The abrasion resistance becomes generally higher with increase of the hardness, while the toughness reversely lowers, so that by taking account of this point, the hardness of the brake disc is limited to a range of 30–40 in $H_RC$.

As stainless steels to be used for this application, use has been made of high carbon martensitic stainless steels, such as 16Cr–0.3C, SUS 420J1 having C of 0.2%, SUS 420J2 having C of 0.3% and for providing the properties for the brake disc materials, heat treatments such as quenching at a temperature of 850°–1,050° C., or such quenching and tempering are carried out.

However, in such prior steels, an amount of carbon in the steels is as high as 0.2–0.3% and the hardness of martensite itself caused in the quenching operation is as high as 50–60 in $H_RC$ and the toughness is poor and quenching cracks are readily caused in the quenching operation.

Accordingly, in order to control the hardness to 30–40 in $H_RC$ only by the quenching operation, the steel should be the mixed structure wherein two phases of martensite and ferrite are mixed in a moderate ratio and the ratio varies depending upon the temperature of heat treatment for quenching and particularly varies in a range of 800°–900° C. and the hardness varies from about 5 to 45 in $H_RC$. In addition, the hardness is apt to be affected by a slight variation of the components of the steel sheet, so that the very strict and severe control of quality and the control of the conditions of the quenching heat treatment are required in the production.

Furthermore, when the quenching and tempering are carried out, there are caused the problems of the quenching cracks formed in the hardening and the processing trouble. Besides, the tempering is usually effected within a range of 550°–650° C. for controlling $H_RC$ in a range of 30–40, so that a zone of a low Cr concentration is formed around carbide and nitride of Cr precipitated owing to this heat treatment to lower the corrosion resistance.

SUMMARY OF INVENTION

An object of the present invention is to provide motorcycle braking disc materials of a low carbon martensitic stainless steel in which the difficulties of the prior technics have been solved so that the properties for the motorcycle brake disc are obtained only by quenching from a broad range of temperature without needing the severe heat treatment and the production is easy.

The present invention is characterized in a motorcycle disc braking material of a low carbon martensitic stainless steel, which comprises 0.04–0.10% of C+N, not greater than 0.5% of Si, 1.0–2.5% of Mn, not greater than 0.5% of Ni, not greater than 0.5% of Cu and 10.0–14.5% of Cr and the remainder being substantially Fe.

In the present invention, the structure consisting substantially of austenite single phase is obtained in a broad range of heat treatment of about 850°–1,050° C. by increasing Mn to 1.0–2.5% even in a low content of C+N of 0.04–0.10% without increasing carbon to a high content, the hardness and toughness suitable for the motorcar disc brake are easily obtained by transforming the structure into martensite only by quenching from the above described temperature range and the excellent corrosion resistance is provided by containing 10.0–14.5% of Cr without causing the deterioration due to the tempering.

Explanation will be made with respect to the reason of limitation of the components of low carbon martensitic stainless steels of the present invention.

C+N: 0.04–0.10%:

C and N are effective elements for improving the hardness and abrasion resistance and in the present invention, 1.0–2.5% of Mn is essential based on the below described reason and in Mn content of this range, the content of C+N for obtaining the hardness in quenching of 30–40 in $H_RC$ is 0.04–0.10%, so that this content is limited to the range of 0.04–0.10%. This value is smaller than the content of the prior steels, so that the toughness in the quenching is good and no quenching crack is formed.

Si: not greater than 0.5%:

Si is an element for forming ferrite at high temperatures and the addition of Si of more than 0.5% deteriorates the quenching hardness and adversely affects the toughness, so that the upper limit is defined to be 0.5% but the amount is preferred to be smaller.

Mn: 1.0–2.5%:

Mn is an effective element for preventing the formation of δ-ferrite at high temperatures and is an essential component for attaining the object of the present invention. However, when the content is less than 1%, if the content of C+N is low even at the temperature range of 900°–1,050° C., δ-ferrite is formed and the quenching hardness of 30–40 in $H_RC$ is not obtained. Thus, in order to provide the hardness of 30–40 in $H_RC$, the content of C+N should be increased to a high concentration but the concentration range of the moderate content of C+N is very narrow and it is difficult to stably control the concentration range in the steel making step and further if Mn is as low as less than 1%, the temperature range of the quenching heat treatment for providing the hardness of 30–40 in $H_RC$ is very narrow and the temperature control becomes difficult, so that the lower limit is defined to be 1% in view of the object of the present invention. When Mn exceeds 2.5%, the oxidation resistance at high temperatures lowers and the formation of scales in the steps for producing the steel sheet is much and the sheet surface is roughened upon pickling and the dimension precision of the steel sheet is considerably deteriorated, so that the upper limit is limited to 2.5%.

Ni: not greater than 0.5%:

Ni is effective for preventing the formation of δ-ferrite at high temperatures as in Mn. In the present invention, the object can be attained by addition of Mn of 1.0–2.5%, so that it is not necessary to particularly add Ni but it is inevitable that about 0.1–0.5% of Ni is admixed from scraps used in the steel making steps and the presence of such an amount does not disturb the above described balance and does not cause the particular hindrance, so that only the upper limit is defined to be 0.5%.

Cu: not greater than 0.5%:

Cu is effective for preventing the formation of δ-ferrite at high temperatures as in Ni. In the present invention, since Mn is added, it is not necessary to particularly add Cu but when Cu admixed from scraps in the steel making steps exceeds 0.5%, the hot workability at high temperatures is deteriorated and the yield in the steps for producing the steel sheets is considerably reduced, so that the upper limit is defined to be 0.5%.

Cr: 10.0–14.5%:

Cr is essential in amount of 10% in the lower limit for maintaining the corrosion resistance. However, when Cr exceeds 14.5%, even if the upper limit of each of Mn, Ni and Cu is added, δ-ferrite is formed even in the quenching temperature range of 850°–1,050° C. and the quenching hardness of 30–40 in $H_RC$ cannot be obtained, so that the upper limit is defined to be 14.5%.

In the present invention, concerning the main elements contained in the steel composition as impurities other than the above described main components, P should be lowered as far as possible in view of the toughness and S is preferred to be lower in view of the rust resistance. O is harmful for the toughness and rust resistance, so that it is preferable to effect deoxidation by using Al so that Al in the steel is less than 0.05%. Furthermore, rare earth elements may be added in order to improve the corrosion resistance and toughness by controlling the shape of sulfides but of course, such a case is belongs to the scope of the present invention.

As mentioned above, in martensitic stainless steels of the present invention, by limiting Mn in the component composition to 1.0–2.5%, the hardness of 30–40 in $H_RC$ and the high toughness can be ensured without forming quenching cracks only by quenching from the broad temperature range of 850°–1,050° C. without needing the strict control of heat treatment even in a low content of C+N of 0.04–0.10%, and it is not necessary to effect the tempering, so that the improvement of corrosion resistance due to the addition of Cr can be effectively attained and all various properties necessary for the motorcycle disc braking materials can be provided.

BEST MODE OF CARRYING OUT THE INVENTION

Each steel of the components of No. 1–No. 10 shown in the following Table 1 was melted in an amount of 50 kg in a high frequency small size of melting furnace and subjected to a hot rolling and an annealing under well known conditions to prepare a thickness of 6 mm of hot rolled annealed sheet, then the annealed sheet was kept at a temperature range of 800°–1,050° C. for 5 minutes and thereafter oil quenched and the relation of the quenching temperature to the hardness, toughness and corrosion resistance was examined. Sample Nos. 1–5 are the steels of the present invention and sample Nos. 6–10 are comparative steels which are not covered by the scope of the present invention.

TABLE 1

| Steel No. | Chemical components (weight %) | | | | | | | | |
|---|---|---|---|---|---|---|---|---|---|
| | C | N | Si | Mn | P | S | Ni | Cu | Cr |
| Present invention 1 | 0.030 | 0.025 | 0.14 | 1.69 | 0.019 | 0.001 | 0.12 | 0.005 | 13.1 |
| 2 | 0.055 | 0.015 | 0.16 | 1.41 | 0.021 | 0.002 | 0.05 | 0.006 | 12.5 |
| 3 | 0.076 | 0.010 | 0.15 | 1.23 | 0.020 | 0.005 | 0.35 | 0.23 | 12.0 |
| 4 | 0.061 | 0.014 | 0.15 | 1.36 | 0.020 | 0.004 | 0.23 | 0.12 | 13.9 |
| 5 | 0.052 | 0.008 | 0.16 | 1.80 | 0.019 | 0.004 | 0.09 | 0.11 | 14.1 |
| Comparative steel 6 | 0.021 | 0.015 | 0.15 | 1.42 | 0.021 | 0.002 | 0.09 | 0.005 | 13.0 |
| 7 | 0.12 | 0.014 | 0.14 | 1.51 | 0.021 | 0.003 | 0.19 | 0.006 | 12.9 |
| 8 | 0.20 | 0.021 | 0.35 | 0.50 | 0.020 | 0.002 | 0.08 | 0.11 | 13.5 |
| 9 | 0.31 | 0.015 | 0.31 | 0.44 | 0.020 | 0.004 | 0.07 | 0.07 | 13.5 |
| 10 | 0.30 | 0.013 | 0.50 | 0.45 | 0.020 | 0.004 | 0.15 | 0.08 | 16.1 |

The relation of Rockwell hardness to the quenching temperature is shown in Table 2.

TABLE 2

| Steel No. | Rockwell hardness $H_RC$ Quenching temperature | | | | | |
|---|---|---|---|---|---|---|
| | 800° C. | 850° C. | 900° C. | 950° C. | 1,000° C. | 1,050° C. |
| Present invention 1 | 6.8 | 31.9 | 31.5 | 31.2 | 31.8 | 31.5 |
| 2 | 7.2 | 34.0 | 34.4 | 34.5 | 34.0 | 34.8 |
| 3 | 10.5 | 38.1 | 38.5 | 38.3 | 38.0 | 37.9 |
| 4 | 7.5 | 35.5 | 35.3 | 36.0 | 35.4 | 35.7 |
| 5 | 18.5 | 34.0 | 33.5 | 33.8 | 33.3 | 33.6 |
| Comparative steel 6 | 5.2 | 20.1 | 23.2 | 25.6 | 28.7 | 28.0 |
| 7 | 25.6 | 45.3 | 46.0 | 46.3 | 46.0 | 45.8 |
| 8 | 5.8 | 28.2 | 42.1 | 45.3 | 50.3 | 51.0 |
| 9 | 5.5 | 32.1 | 46.1 | 52.3 | 56.1 | 57.4 |
| 10 | 7.7 | 28.3 | 35.0 | 42.3 | 54.4 | 54.5 |

In the comparative steels, the temperature range for obtaining the quenching hardness of 30–40 in $H_RC$ is very narrow, while in the steels of the present invention, the temperature range is as very broad as 850°–1,050° C.

The relation of the results of the impact test at room temperature to the quenching temperature using test piece of JIS No. 4, ½ size is shown in Table 3.

TABLE 3

| Steel No. | Impact value at room temperature (kgf.m/cm²) Quenching temperature | | | | | |
|---|---|---|---|---|---|---|
| | 800° C. | 850° C. | 900° C. | 950° C. | 1,000° C. | 1,050° C. |
| Present invention 1 | 10.0 | 10.3 | 9.8 | 8.9 | 9.8 | 10.0 |
| 2 | 9.5 | 9.6 | 9.2 | 7.7 | 6.1 | 5.6 |
| 3 | 8.1 | 8.3 | 6.2 | 5.7 | 5.5 | 5.3 |
| 4 | 9.8 | 9.7 | 9.3 | 9.0 | 9.5 | 9.7 |
| 5 | 11.1 | 11.2 | 10.8 | 11.1 | 11.0 | 10.9 |
| Comparative steel 6 | 9.8 | 9.5 | 9.8 | 9.6 | 9.7 | 9.4 |
| 7 | 6.7 | 4.3 | 2.1 | 1.5 | 1.2 | 0.7 |
| 8 | 3.5 | 2.0 | 1.5 | 1.3 | 0.7 | 0.3 |
| 9 | 2.6 | 1.7 | 1.6 | 1.1 | 0.7 | 0.3 |
| 10 | 8.2 | 5.8 | 1.5 | 0.7 | 0.7 | 0.7 |

As seen from Table 3, the steels of the present invention are 30–40 in $H_RC$ in the quenching hardness but far higher in the toughness than the comparative steels and the impact value in the broad range of quenching temperature of 850°–1,050° C. is more than 5 kgf·m/cm² and the steels have the satisfactory toughness which do not cause the quenching cracks.

The relation of a salt spray test defined in JIS Z2371 to the quenching temperature is shown in Table 4.

TABLE 4

| Steel No. | Salt spray test (35° C., 4 hr) Quenching temperature | | | | | |
|---|---|---|---|---|---|---|
| | 800° C. | 850° C. | 900° C. | 950° C. | 1,000° C. | 1,050° C. |
| Present invention 1 | o | o | o | o | o | o |
| 2 | o | o | o | o | o | o |
| 3 | o | o | o | o | o | o |
| 4 | o | o | o | o | o | o |
| 5 | o | o | o | o | o | o |
| Comparative steel 6 | o | o | o | o | o | o |
| 7 | o | o | o | o | o | o |
| 8 | x | x | o | o | o | o |
| 9 | x | x | o | o | o | o |
| 10 | x | x | o | o | o | o | o: No rust
x: Rust

The steels of the present invention do not cause rust in a broad quenching temperature range of 800°–1,050° C. and are high in the corrosion resistance.

INDUSTRIAL APPLICABILITY

In the steels of the present invention, the moderate hardness and toughness and the excellent corrosion resistance necessary for the motorcycle brake disc can be obtained only by the quenching from the broader range of quenching temperature than the prior arts, so that the mass production in industrial scale can be easily realized and the production cost can be reduced.

What is claimed is:

1. A motorcycle braking disc made of a low carbon martensitic stainless steel consisting of, by weight percent, 0.04–0.10% of C+N, not greater than 0.5% of Si, 1.0–2.5% of Mn, not greater than 0.5% of Ni, not greater than 0.5% of Cu, 10.0–14.5% of Cr, and the remainder being substantially Fe, wherein said martensitic stainless steel material has been subjected to a quenching thermal treatment at a single phase temperature range without affecting the tempering treatment.

* * * * *